(12) United States Patent
Zhang et al.

(10) Patent No.: US 11,887,215 B2
(45) Date of Patent: Jan. 30, 2024

(54) IMAGE PROCESSING APPARATUS AND METHOD FOR STYLE TRANSFORMATION

(71) Applicant: Samsung Electronics Co., Ltd., Suwon-si (KR)

(72) Inventors: Lei Zhang, Suwon-si (KR); Yehoon Kim, Suwon-si (KR); Chanwon Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 17/416,293

(22) PCT Filed: Dec. 23, 2019

(86) PCT No.: PCT/KR2019/018302
§ 371 (c)(1),
(2) Date: Jun. 18, 2021

(87) PCT Pub. No.: WO2020/130747
PCT Pub. Date: Jun. 25, 2020

(65) Prior Publication Data
US 2022/0067421 A1     Mar. 3, 2022

(30) Foreign Application Priority Data

Dec. 21, 2018   (KR) .................. 10-2018-0167895

(51) Int. Cl.
*G06T 11/00*     (2006.01)
*G06T 5/50*      (2006.01)
(Continued)

(52) U.S. Cl.
CPC ............ *G06T 11/00* (2013.01); *G06F 18/214* (2023.01); *G06N 20/00* (2019.01); *G06T 5/50* (2013.01); *G06V 10/82* (2022.01); *G06V 20/70* (2022.01)

(58) Field of Classification Search
None
See application file for complete search history.

(56) References Cited

U.S. PATENT DOCUMENTS

| 9,692,963 B2 | 6/2017 | Yim et al. |
| 2018/0074977 A1 | 3/2018 | Smaus et al. |

(Continued)

FOREIGN PATENT DOCUMENTS

| CN | 108629747 A | * 10/2018 | ........... G06N 3/0454 |
| CN | 108629747 A | 10/2018 | |

(Continued)

OTHER PUBLICATIONS

International Search Report dated Apr. 1, 2020, issued in International Application No. PCT/KR2019/018302.
(Continued)

*Primary Examiner* — Vincent Rudolph
*Assistant Examiner* — Meredith I Taylor
(74) *Attorney, Agent, or Firm* — Jefferson IP Law, LLP

(57) ABSTRACT

Provided is an image processing method according to an embodiment, which includes: obtaining a label of a first image by inputting the first image to a recognition model; obtaining reference style data for a target reference image to which a visual sentiment label is assigned, the visual sentiment label being the same as the obtained label from among visual sentiment labels pre-assigned to reference images; generating second style data based on first style data for the first image and the obtained reference style data; and generating a second image based on the generated second style data.

13 Claims, 17 Drawing Sheets

(51) Int. Cl.
    *G06F 18/214*    (2023.01)
    *G06V 20/70*     (2022.01)
    *G06N 20/00*     (2019.01)
    *G06V 10/82*     (2022.01)

(56) References Cited

U.S. PATENT DOCUMENTS

| | | |
|---|---|---|
| 2018/0114294 A1 | 4/2018 | Yang et al. |
| 2018/0118270 A1 | 5/2018 | Tani et al. |
| 2018/0322662 A1 | 11/2018 | Hellier et al. |

FOREIGN PATENT DOCUMENTS

| | | | |
|---|---|---|---|
| JP | 2012-146071 A | | 8/2012 |
| JP | 2012146071 A | * | 8/2012 |
| JP | 2018-132855 A | | 8/2018 |
| KR | 10-1555428 B1 | | 9/2015 |
| KR | 10-2018-0074977 A | | 7/2018 |
| KR | 10-2018-0118270 A | | 10/2018 |
| KR | 20180118270 A | * | 10/2018 |

OTHER PUBLICATIONS

Takuya Narihira et al., Mapping Images to Sentiment Adjective Noun Pairs with Factorized Neural Nets, Nov. 21, 2015, XP055870343, Retrieved from the Internet: URL:https://arxiv.org/abs/1511.06838 [retrieved on Dec. 7, 2021].
European Search Report dated Dec. 20, 2021, issued in European Application No. 19897670.6.
Korean Office Action dated Mar. 13, 2023, issued in Korean Patent Application No. 10-2018-0167895.
European Office Action dated Feb. 16, 2023, issued in European Patent Application No. 19 897 670.6.

* cited by examiner

FIG. 4

| | 31 |
|---|---|
| REFERENCE IMAGE 1 | 1. Beautiful sunset<br>2. Blue sky<br>3. Amazing beach |
| REFERENCE IMAGE 2 | 1. Beautiful sunrise<br>2. Large mountain |
| ⋮ | ⋮ |

IMAGE PROCESSING APPARATUS AND METHOD FOR STYLE TRANSFORMATION

TECHNICAL FIELD

The present disclosure relates to an artificial intelligence (AI) system and an application thereof for simulating functions of a human brain such as cognition and decision-making by using machine learning algorithms such as deep learning.

BACKGROUND ART

An artificial intelligence (AI) system is a computer system that realizes human-level intelligence, and enables machines to become smart by learning and making decisions on their own, unlike existing rule-based smart systems. An AI system may improve its recognition rates and is capable of understanding a user's preferences more accurately through experience, and thus, existing rule-based smart systems are increasingly being replaced with deep learning-based AI systems.

AI technology consists of machine learning (deep learning) and element technologies using machine learning.

Machine learning is an algorithmic technology for autonomously classifying/learning features of input data, and element technologies are technologies for simulating functions of a human brain such as cognition and decision-making by using machine learning algorithms such as deep learning and include technical fields such as linguistic understanding, visual understanding, reasoning/prediction, knowledge representation, motion control, etc.

Various technical fields to which AI technology is applied are as follows. Linguistic understanding is a technology for recognizing and applying/processing human language/characters and includes natural language processing, machine translation, a dialog system, question answering, speech recognition/synthesis, etc. Visual understanding is a technology for recognizing and processing an object in the same way as performed by a human visual system, and includes object recognition, object tracking, image retrieval, person recognition, scene understanding, spatial understanding, image enhancement, etc. Reasoning/prediction is a technology for judging information and logically inferring and predicting new information and includes knowledge/probability-based inferring, optimization prediction, preference-based planning, recommendations, etc. Knowledge representation is a technology for automatically processing information about human experience as knowledge data and includes knowledge construction (data generation/classification), knowledge management (data utilization), etc. Motion control is a technology for controlling autonomous driving of a vehicle and motion of a robot and includes movement control (navigation, collision avoidance, and travelling), manipulation control (action control), etc.

Moreover, with the widespread use of mobile devices and social network service (SNS), users have been capturing images of objects by using a camera of a mobile device anytime, anywhere, and uploading the captured images to an SNS server. Mobile device users have been attempting to edit images through various image editing programs in order to improve the quality or atmosphere of an image, but it may be somewhat difficult for users having no specialized knowledge to perform such an editing process. Thus, there is a need for a method of transforming a style of an image to match a style desired by a user even when the user has no specialized knowledge about it.

DESCRIPTION OF EMBODIMENTS

Technical Problem

A technical objective of the disclosure is to provide an image processing apparatus and method according to embodiments, which are capable of easily transforming a style of an image without needing specialized knowledge.

Another technical objective is to provide an image processing apparatus and method according to embodiments, which are capable of reducing an amount of data to be stored in an apparatus for performing style transformation.

Solution to Problem

An image processing method according to an embodiment includes: obtaining a label of a first image by inputting the first image to a recognition model; obtaining reference style data for a target reference image to which a visual sentiment label is assigned, the visual sentiment label being the same as the obtained label from among visual sentiment labels pre-assigned to reference images; generating second style data based on first style data for the first image and the obtained reference style data; and generating a second image based on the generated second style data.

Advantageous Effects of Disclosure

An image processing apparatus and method according to embodiments may easily transform a style of an image even without special knowledge.

Furthermore, the image processing apparatus and method according to the embodiments may reduce an amount of data to be stored in a device that performs style transformation.

However, effects that can be achieved by an image processing apparatus and method according to embodiments are not limited to those mentioned above, and other effects not mentioned may be clearly understood from the following description by those of ordinary skill in the art to which the present disclosure belongs.

BRIEF DESCRIPTION OF DRAWINGS

A brief description of the accompanying drawings is provided in order to more fully understand the drawings recited in the present specification.

FIG. 4 is an exemplary diagram illustrating visual sentiment labels assigned to reference images.

BEST MODE

Figure 1:
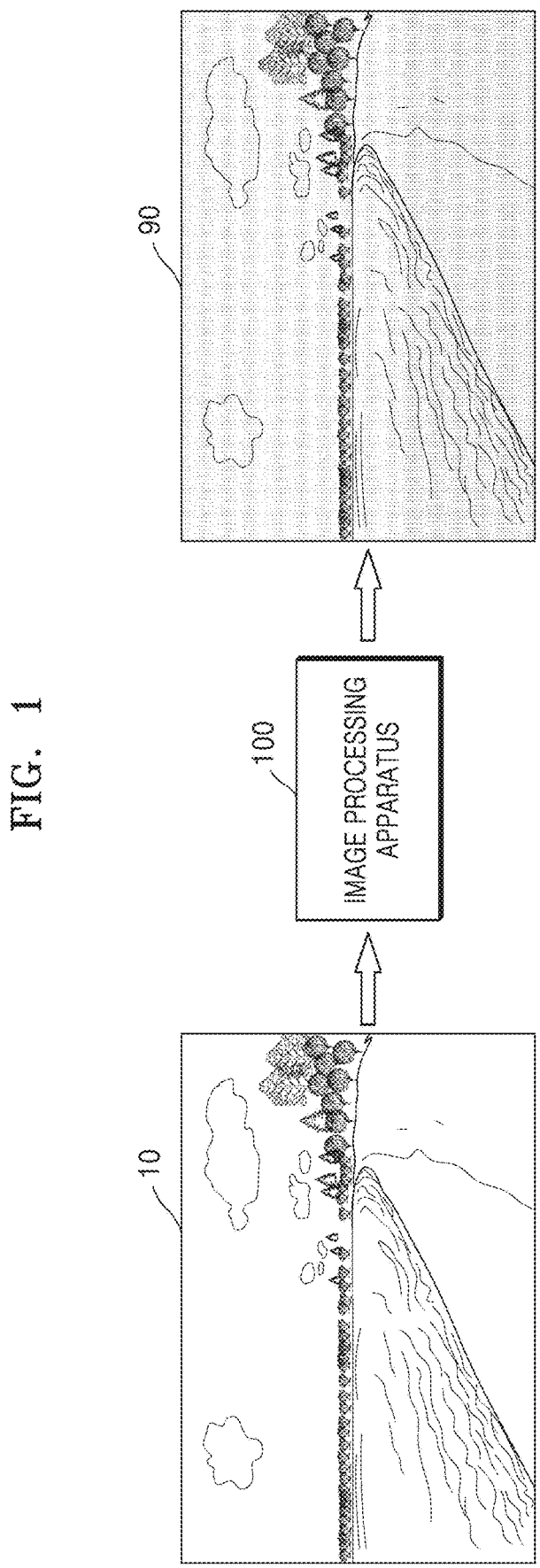
FIG. 1 is a schematic diagram for describing an operation of an image processing apparatus according to an embodiment.

An image processing method according to an embodiment includes: obtaining a label of a first image by inputting the first image to a recognition model; obtaining reference style data for a target reference image to which a visual sentiment label is assigned, the visual sentiment label being the same as the obtained label from among visual sentiment labels pre-assigned to reference images; generating second style data based on first style data for the first image and the obtained reference style data; and generating a second image based on the generated second style data.

In an exemplary embodiment, the obtaining of the reference style data for the target reference image may include: calculating a degree of relevance to the first image for each of at least one candidate reference image to which the same visual sentiment label as the label of the first image is assigned; and selecting, based on the calculated degree of relevance, the target reference image from among the at least one candidate reference image.

In an exemplary embodiment, the obtaining of the label of the first image may include obtaining a plurality of labels of the first image and probability values respectively corresponding to the plurality of labels, and the calculating of the degree of relevance may include, for each of the at least one candidate reference image to which the same one or more visual sentiment labels as one or more of the plurality of labels of the first image are assigned, calculating an average of probability values respectively corresponding to the one or more labels as the degree of relevance.

In an exemplary embodiment, the selecting of the target reference image may include: displaying, on a display, at least one thumbnail image corresponding to the at least one candidate reference image in an order based on the degree of relevance; and selecting, as the target reference image, a candidate reference image corresponding to a thumbnail image selected by a user from among the at least one thumbnail image.

In an exemplary embodiment, the obtaining of the reference style data for the target reference image may include selecting, based on a frequency of selection by the user, the target reference image from among the at least one candidate reference image to which the same visual sentiment label as the label of the first image is assigned.

In an exemplary embodiment, the obtaining of the label of the first image may include obtaining a label of a region of interest (ROI) in the first image by inputting the ROI to the recognition model, and the obtaining of the reference style data for the target reference image may include obtaining the reference style data for the target reference image to which the same vertical sentiment label as the label of the ROI is assigned.

In an exemplary embodiment, the obtaining of the reference style data for the target reference image may include: identifying at least one candidate reference image to which the same vertical sentiment label as the label of the ROI is assigned; calculating a degree of relevance to the first image for each of the at least one candidate reference image; and selecting, based on the calculated degree of relevance, the target reference image from among the at least one candidate reference image.

In an exemplary embodiment, the obtaining of the label of the first image may include obtaining a plurality of labels of the first image and probability values respectively corresponding to the plurality of labels, and the calculating of the degree of the relevance may include, for each of at least one candidate reference image to which the same one or more visual sentiment labels as one or more of the plurality of labels of the first image are assigned, calculating an average of probability values respectively corresponding to the one or more labels as the degree of relevance, wherein a probability value corresponding to the label of the ROI is set to a preset value.

In an exemplary embodiment, the image processing method may further include changing internal parameters of the recognition model to internal parameters corresponding to a reference image group selected by the user from among a plurality of reference image groups; and inputting the first image to the recognition model that has the changed internal parameters.

In an exemplary embodiment, the plurality of reference image groups are classified according to a creator of reference images.

In an exemplary embodiment, the image processing method may further include: connecting to a server and receiving a reference image group list from the server; receiving a selection, from a user, of at least one reference image group from the reference image group list; and receiving, from the server, internal parameters of the recognition model trained based on reference images included in the selected at least one reference image group, reference style data for the reference images included in the at least one reference image group, and visual sentiment labels assigned to the reference images included in the at least one reference image group.

In an exemplary embodiment, the image processing method may further include: obtaining the first style data for the first image by inputting the first image to a feature extraction model; and generating a second image by inputting the generated second style data to a feature synthesis model.

An image processing method according to an embodiment includes: selecting, as at least one candidate reference image, at least one reference image related to a first image from among a plurality of reference images; displaying, on a display, at least one thumbnail image respectively corresponding to the at least one candidate reference image; selecting, as a target reference image, a candidate referenced image corresponding to a thumbnail image selected by a user from among the at least one thumbnail image; and generating a second image different from the first image based on features of the target reference image.

An image processing apparatus according to an embodiment includes: a processor; and a memory storing a recognition model and at least one program, wherein the processor is configured to execute the at least one program to: obtain a label of a first image by inputting the first image to the recognition model; obtain reference style data for a target reference image to which a visual sentiment label is assigned, the visual sentiment label being the same as the obtained label from among visual sentiment labels pre-assigned to reference images; generate second style data based on first style data for the first image and the obtained reference style data; and generate a second image based on the generated second style data.

In an exemplary embodiment, the processor may calculate a degree of relevance to the first image for each of at least one candidate reference image to which the same visual sentiment label as the label of the first image is assigned, and select, based on the calculated degree of relevance, the target reference image from among the at least one candidate reference image.

In an exemplary embodiment, the processor may obtain a plurality of labels of the first image and probability values respectively corresponding to the plurality of labels, and for each of the at least one candidate reference image to which the same one or more visual sentiment labels as one or more of the plurality of labels of the first image are assigned, calculate an average of probability values respectively corresponding to the one or more labels as the degree of relevance.

In an exemplary embodiment, the processor may display, on a display, at least one thumbnail image corresponding to the at least one candidate reference image in an order based on the degree of relevance, and select, as the target reference image, a candidate reference image corresponding to a thumbnail image selected by the user from among the at least one thumbnail image.

In an exemplary embodiment, the processor may select, based on a frequency of selection by the user, the target reference image from among the at least one candidate reference image to which the same visual sentiment label as the label of the first image is assigned.

In an exemplary embodiment, the processor may obtain a label of an ROI in the first image by inputting the ROI to the recognition model, and obtain the reference style data for the target reference image to which the same vertical sentiment label as the label of the ROI is assigned.

MODE OF DISCLOSURE

In the present disclosure, various changes may be made, and numerous embodiments may be provided. Particular embodiments are illustrated in the drawings and will be described in detail in the detailed description. However, the present disclosure is not intended to be limited to the particular embodiments thereof, and it should be understood that all changes, equivalents, and substitutes that do not depart from the spirit and technical scope of the present disclosure are encompassed in the disclosure.

In describing embodiments, when it is determined that detailed descriptions of related known technologies may unnecessarily obscure the essence of the disclosure, the descriptions thereof will be omitted. Furthermore, numbers (e.g., a first, a second, etc.) used in the description of the embodiments are merely identifying symbols for distinguishing one element from another.

Furthermore, throughout the present specification, it should be understood that when an element is referred to as being "connected" or "coupled" to another element, it may be directly connected or coupled to the other element, but may be connected or coupled to the other element with an intervening element interposed therebetween unless there is a particular description contrary thereto.

Furthermore, in the present specification, for an element expressed as a "unit", a "module", or the like, two or more elements may be combined into a single element, or a single element may be divided into two or more elements according to subdivided functions. Furthermore, each element to be described below may further perform, in addition to its main functions, some or all of functions performed by another element, and some of the main functions of each element may be performed entirely by another component.

Furthermore, in the present specification, a 'first image' refers to an image on which style transformation is to be performed, and a 'second image' refers to an image generated by performing the style transformation.

Hereinafter, embodiments based on a technical idea of the present disclosure will be sequentially described in detail.

FIG. 1 is a schematic diagram for describing an operation of an image processing apparatus 100 according to an embodiment.

The image processing apparatus 100 generates a second image 90 by transforming a style of the first image 10. The first image 10 may be an image stored in the image processing apparatus 100, or may be a preview image recognized via a camera of the image processing apparatus 100.

The image processing apparatus 100 may generate the second image 90 by transforming the style of the first image 10 according to a style of a reference image having a high relevance to the first image 10 among several reference images. The same objects are included in the first and second images 10 and 20, but features of the second image 20 (brightness, contrast, viewpoint, tone, white balance, sharpness, histogram, etc.) may be different from features of the first image 10.

A 'reference image' may include, for example, an image captured and/or edited by a professional creator. Because it is difficult for the user himself or herself to capture an image having the same style as a reference image or edit an existing image, according to an embodiment, the second image 90 generated by performing transformation according to a style of the reference image may be easily obtained using a method such as the user selecting a reference image.

The image processing apparatus 100 may be implemented as a user device or a server. For example, the user device may include various types of devices such as a smartphone, a desktop computer, a notebook, a tablet PC, etc. An operation when the image processing apparatus 100 is implemented as a user device or a server will be described below.

Figure 2:
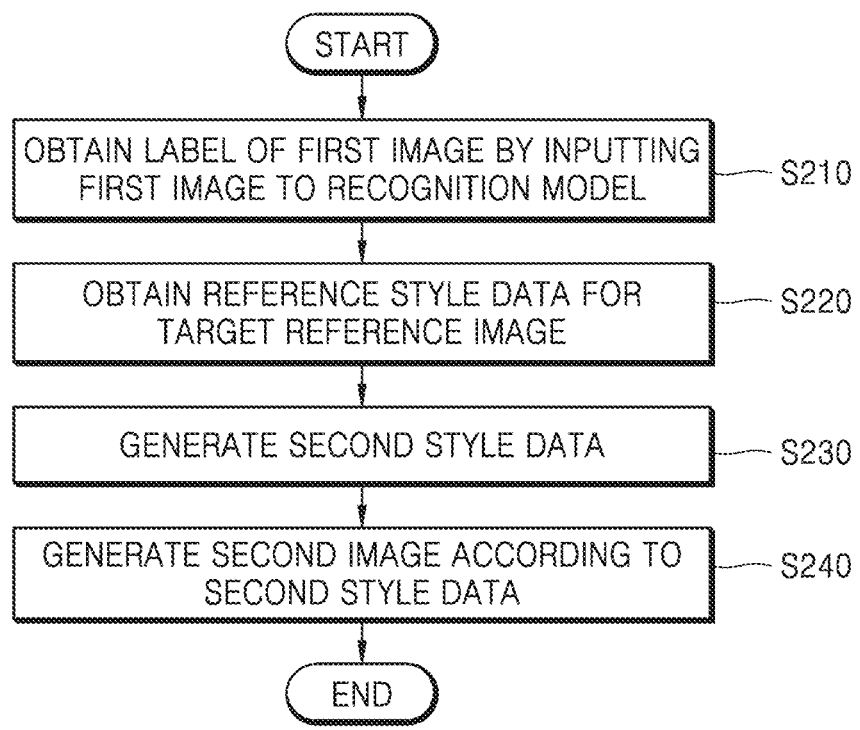
FIG. 2 is a flowchart of an image processing method according to an embodiment.

FIG. 2 is a flowchart of an image processing method according to an embodiment.

In operation S210, the image processing apparatus 100 inputs the first image 10 to the recognition model and obtains a label of the first image 10 output from the recognition model.

In an embodiment, the label may be information describing content of the first image 10. For example, when the first image 10 includes an ocean, the recognition model may output a label such as a 'cool ocean'.

The recognition model may be trained based on reference images to which visual sentiment labels are pre-assigned, and analyze the first image 10 to output a label corresponding to the first image 10 from among several visual sentiment labels. The recognition model may include, for example, an object recognition deep neural network (DNN).

In operation S220, the image processing apparatus 100 obtains reference style data for a target reference image to which the same visual sentiment label as the label of the first image 10 is assigned from among reference images to which visual sentiment labels are pre-assigned.

When a plurality of labels related to the first image 10 are output from the recognition model, the image processing apparatus 100 may identify at least one candidate reference image to which the same visual sentiment labels as one or more of the plurality of labels are assigned and select a target reference image from among the at least one candidate reference image. A method of selecting a target reference image from among at least one candidate reference image will be described below with reference to FIGS. 5 through 7.

Reference style data for a target reference image may include at least one of brightness data, contrast data, viewpoint data, tone data, white balance data, sharpness data, histogram data, and feature map of the target reference image. Pieces of reference style data for reference images may be prestored in the image processing apparatus 100, and when a target reference image is selected from among the reference images, the image processing apparatus 100 may obtain reference style data corresponding to the target reference image.

In operation S230, the image processing apparatus 100 generates second style data based on first style data for the first image 10 and the reference style data for the target reference image. In this case, the second style data may be different from the first style data and may be generated by transforming the first style data or be newly generated based on the first style data and the reference style data.

For example, the image processing apparatus 100 may generate the second style data by transforming at least one of brightness, contrast, viewpoint, tone, white balance, sharpness, histogram, and feature map of the first image 10 based on at least one of brightness, contrast, viewpoint, tone, white balance, sharpness, histogram, and feature map of the target reference image.

As an example, the image processing apparatus 100 may generate second style data by transforming at least one of brightness, contrast, viewpoint, tone, white balance, sharpness, histogram, and feature map of the first image 10 to be similar to or the same as corresponding at least one of brightness, contrast, viewpoint, tone, white balance, sharpness, histogram, and feature map of the target reference image.

In addition, as an example, the image processing apparatus 100 may generate a new feature map based on a feature map of the first image 10 and a reference feature map of the target reference image.

In operation S240, the image processing apparatus 100 generates a second image 90 based on the second style data. The image processing apparatus 100 may generate the second image 90 by changing the first image 10 according to the second style data or inputting the second style data (e.g., a feature map) to a DNN.

Figure 3:
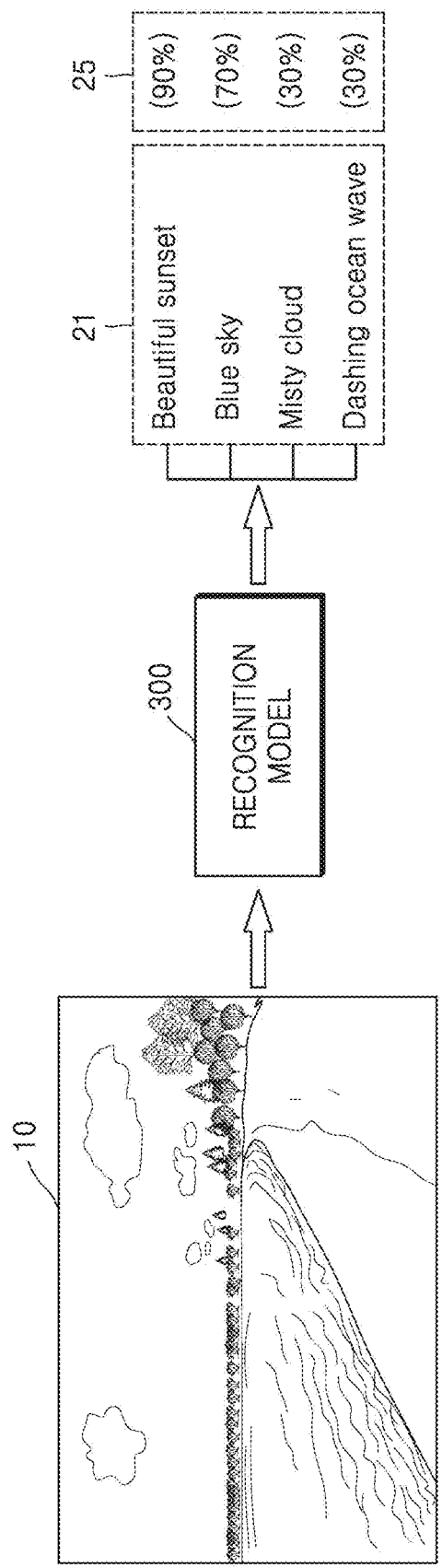
FIG. 3 is an exemplary diagram showing a label obtained by inputting a first image to a recognition model and a probability value of the label.

FIG. 3 is an exemplary diagram showing labels 21 obtained by inputting the first image 10 to a recognition model 300 and probability values 25 of the labels 21.

As described above, the image processing apparatus 100 inputs the first image 10 to the recognition model 300 and obtains the labels 21 for the first image 10 output from the recognition model 300. Referring to FIG. 3, the labels 21 corresponding to the first image 10 may include 'beautiful sunset', 'blue sky', 'misty cloud', and 'dashing ocean wave'. Furthermore, the recognition model 300 may output the probability values 25 respectively corresponding to the labels 21. Each of the probability values 25 may be a value indicating to what extent the first image 10 is relevant to a corresponding one of the labels 21. Because the probability value 25 of 'beautiful sunset' which is one of the labels 21 for the first image 10 is 90%, it can be seen that the first image 10 is highly relevant to 'beautiful sunset'.

The image processing apparatus 100 selects a target reference image to which the same visual sentiment label as a label of the first image 10 is assigned, and as shown in FIG. 4, each reference image may be assigned some of visual sentiment labels 31 for describing the corresponding reference image.

For example, 'beautiful sunset', 'blue sky', and 'amazing beach' among the visual sentiment labels 31 may be assigned to reference image 1, and 'beautiful sunrise' and 'large mountain' thereamong may be assigned to reference image 2.

Hereinafter, a method of selecting a target reference image from among reference images will be described with reference to FIGS. 5 through 7.

Figure 5:
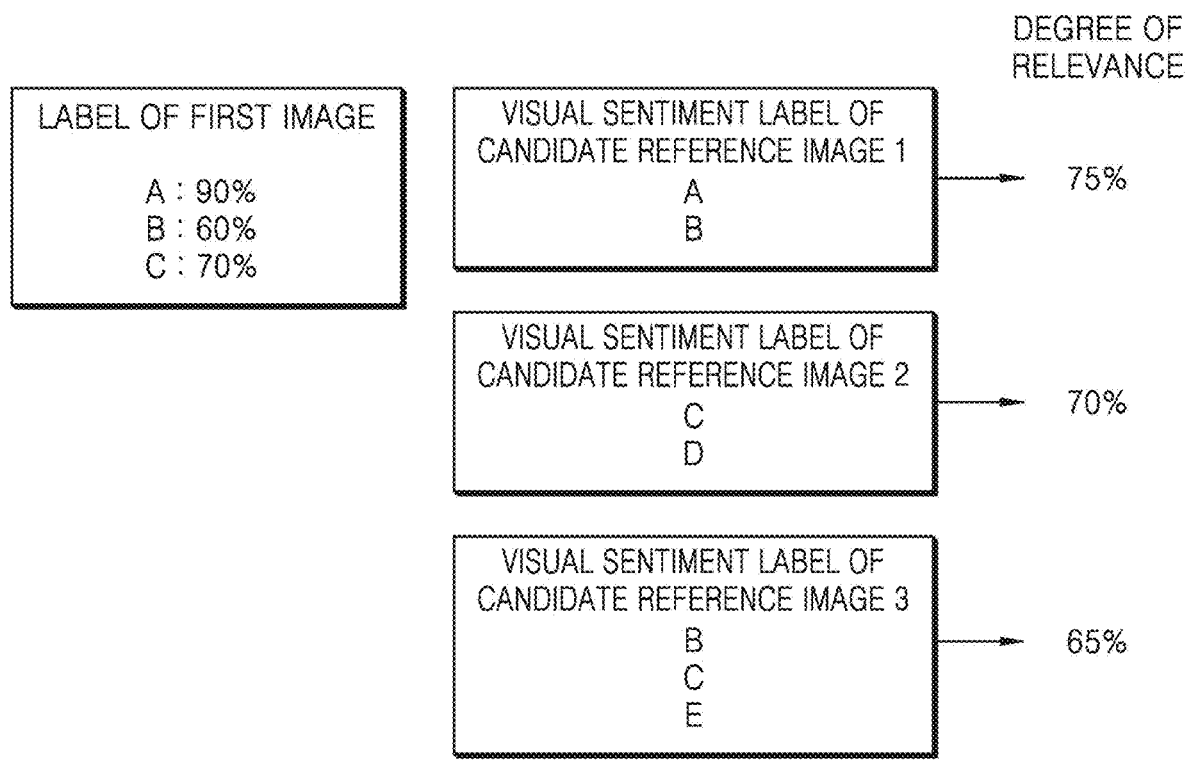
FIG. 5 is a diagram for describing a method of determining a target reference image from among reference images.

Referring to FIG. 5, when labels A, B, and C are obtained as labels of the first image 10, and the labels A, B, and C respectively have probability values of 90%, 60%, and 70%, the image processing apparatus 100 selects, as a candidate reference image, a reference image to which the same visual sentiment labels as one or more of the labels A, B, and C are assigned.

It can be seen that visual sentiment labels of candidate reference image 1 are labels A and B which are the same as the labels A and B of the first image 10 while visual sentiment labels of candidate reference image 2 are labels C and D, of which the label C is the same as the label C of the first image 10. In addition, it can be seen that visual sentiment labels of candidate reference image 3 are labels B, C, and E, of which the labels B and C are the same as the labels B and C of the first image 10.

In an embodiment, the image processing apparatus 100 may select, as a target reference image, a candidate reference image having a highest frequency of selection by the user from among at least one candidate reference image.

Furthermore, in an embodiment, the image processing apparatus 100 may calculate a degree of relevance between each of the at least one candidate reference image and the first image 10, and select a target reference image based on the calculated degree of relevance. For example, the image processing apparatus 100 may select a candidate reference image with a highest degree of relevance as a target reference image.

The degree of relevance is a value indicating how similar content of each candidate reference image is to that of the first image 10, and may be calculated based on probability values of labels of the first image 10.

In an example, for each candidate reference image that is assigned the same visual sentiment labels as one or more of the labels of the first image 10, the degree of relevance may be calculated as an average of probability values of the one or more labels.

Referring to FIG. 5, labels A and B are assigned as common labels to candidate reference image 1, and because probability values of the labels A and B of the first image 10 are respectively 90% and 60%, 75% that is an average of the probability values may be calculated as a degree of relevance of the candidate reference image 1. Furthermore, label C is assigned as a common label to candidate reference image 2, and because a probability value of the label C of the first image 10 is 70%, 70% may be calculated as a degree of relevance of the candidate reference image 2. In addition, labels C and D are assigned as common labels to the candidate reference image 3, and because probability values of the labels B and C of the first image 10 are respectively 60% and 70%, 65% that is an average of the probability values may be calculated as a degree of relevance of the candidate reference image 3.

The image processing apparatus 100 may select, as a target reference image, a candidate reference image (the candidate reference image 1 in FIG. 5) with a highest degree of relevance from among candidate reference images.

In another example, the degree of relevance of each candidate reference image may be calculated based on the number of visual sentiment labels that are the same as labels of the first image 10 from among visual sentiment labels of the corresponding candidate reference image. In this case, referring to FIG. 5, because two visual sentiment labels that are the same as labels of the first image 10 are assigned to each of the candidate reference image 1 and candidate reference image 3 while one visual sentiment label that is the same as a label of the first image 10 is assigned to the candidate reference image 2, a lowest degree of relevance may be calculated for the candidate reference image 2. In addition, a higher degree of relevance may be calculated for a candidate reference image which has a higher average of probability values corresponding to the same visual sentiment labels as labels of the first image 10 between the candidate reference image 1 and the candidate reference image 3.

In an embodiment, when the user selects a region of interest (ROI) from the first image 10, the image processing apparatus 100 may select a target reference image by further taking a label of the ROI into account. For example, when the user selects a portion of the first image 10 displayed on a display via touching, etc., the image processing apparatus 100 may crop the ROI selected by the user from the first image 10 and input the cropped ROI to the recognition model 300. In addition, the image processing apparatus 100 may obtain a label of the ROI and a probability value of the label which are output from the recognition model 300.

Figure 6:
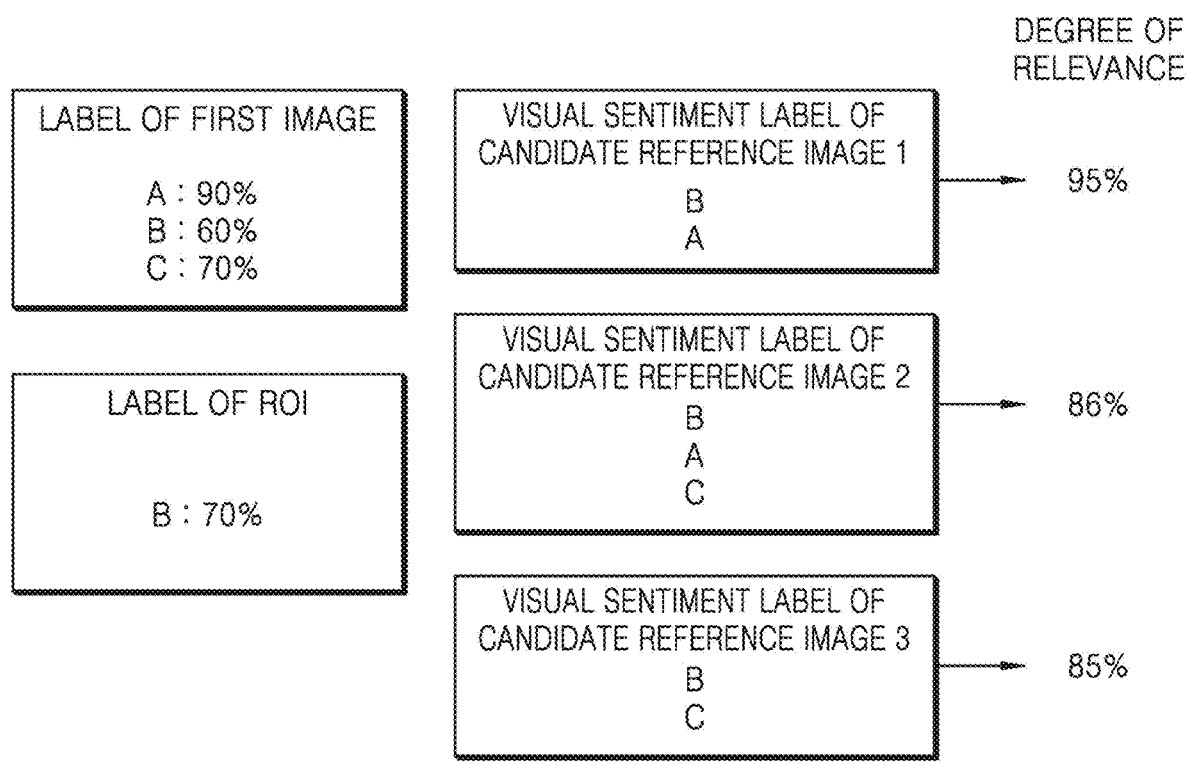
FIG. 6 is a diagram for describing a method of determining a target reference image from among reference images.

Referring to FIG. 6, label A (90%), label B (60%), and label C (70%) are output from the recognition model 300 as labels of the first image 10, and label B (70%) may be output from the recognition model 300 as a label of the ROI. The image processing apparatus 100 may obtain labels and probability values of the labels by inputting both the first image 10 and the ROI to the recognition model 300.

The image processing apparatus 100 may select a target reference image from among candidate reference images to which the same visual sentiment label as the label of the ROI is assigned. Because an ROI is a region on which the user's attention is particularly focused, reference images to which the same visual sentiment label as a label of the ROI is essentially assigned are identified as candidate reference images.

Referring to FIG. 6, when the label B is obtained as the label of the ROI, the candidate reference image 1 to which the labels B and A are assigned, the candidate reference image 2 to which the labels B, A, and C are assigned, and the candidate reference image 3 to which the labels B and C are assigned may be identified.

As described above, the image processing apparatus 100 may select, as a target reference image, a candidate reference image having a highest frequency of selection by the user from among at least one candidate reference image.

Furthermore, in an embodiment, the image processing apparatus 100 may calculate a degree of relevance between each of the at least one candidate reference image and the first image 10, and select a target reference image based on the calculated degree of relevance. For example, the image processing apparatus 100 may select a candidate reference image with a highest degree of relevance as a target reference image.

The image processing apparatus 100 may set, to a preset value (e.g., 100%), a probability value corresponding to a label of an ROI among labels of the first image 10 and then calculate, for each candidate reference image that is assigned the same visual sentiment labels as one or more of the labels of the first image 10, an average of probability values of the one or more labels as the degree of relevance.

For example, in this case, because visual sentiment labels that are the same as the labels of the first image 10 from among visual sentiment labels assigned to the candidate reference image 1 are labels A and B, the degree of relevance of the candidate reference image 1 may be calculated as 95% that is an average of 90% and 100%. Furthermore, because visual sentiment labels that are the same as the labels of the first image 10 from among visual sentiment labels assigned to the candidate reference image 2 are labels A, B, and C, the degree of relevance of the candidate reference image 2 may be calculated as 86% that is an average of 90%, 100%, and 70%. In addition, because visual sentiment labels that are the same as the labels of the first image 10 from among visual sentiment labels assigned to the candidate reference image 3 are labels B and C, the degree of relevance of the candidate reference image 3 may be calculated as 85% that is an average of 100% and 70%. For example, if the degree of relevance may be calculated as 100% for a candidate reference image to which the same visual sentiment label as only the label of the ROI is assigned.

The image processing apparatus 100 may select, as a target reference image, a candidate reference image (the candidate reference image 1 in FIG. 6) with a highest degree of relevance from among candidate reference images.

Figure 7:
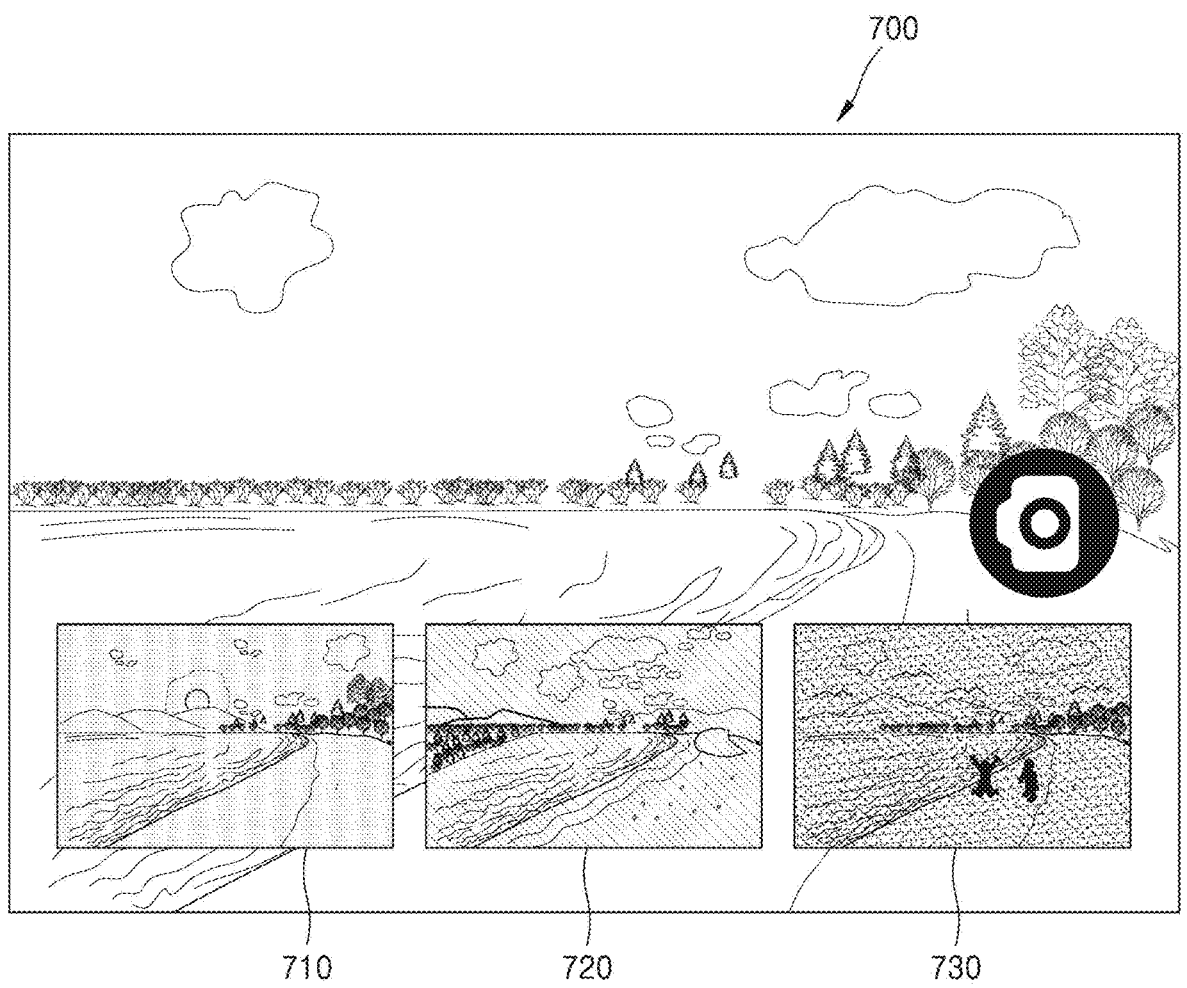
FIG. 7 is an exemplary diagram illustrating thumbnail images displayed on a display.

In an embodiment, when a degree of relevance is calculated for each candidate reference image as described with reference to FIGS. 5 and 6, as shown in FIG. 7, the image processing apparatus 100 may display, on a display 700, thumbnail images 710, 720, and 730 respectively corresponding to candidate reference images in an order based on the degree of relevance. For example, the thumbnail images 710, 720, and 730 respectively corresponding to the candidate reference images may be displayed on the display 700 in order from highest to lowest degrees of relevance. In addition, the image processing apparatus 100 may select, as a target reference image, a candidate reference image corresponding to a thumbnail image selected by the user from among the thumbnail images 710, 720, and 730 displayed on the display 700.

As an example, when the image processing apparatus 100 is implemented as a user device, the image processing apparatus 100 may display the thumbnail images 710, 720, and 730 on its own display. Furthermore, as an example, when the image processing apparatus 100 is implemented as a server, the server may transmit the thumbnail images 710, 720, and 730 to the user device so that the user device may display the thumbnail images 710, 720, and 730 on its display.

In an example, the image processing apparatus 100 may display, on the display, thumbnail images obtained by changing the first image 10 according to styles of the candidate reference images instead of the thumbnail images 710, 720, and 730 respectively corresponding to the candidate reference images, and select, as a target reference image, a candidate reference image corresponding to a thumbnail image selected by the user.

Figure 8:
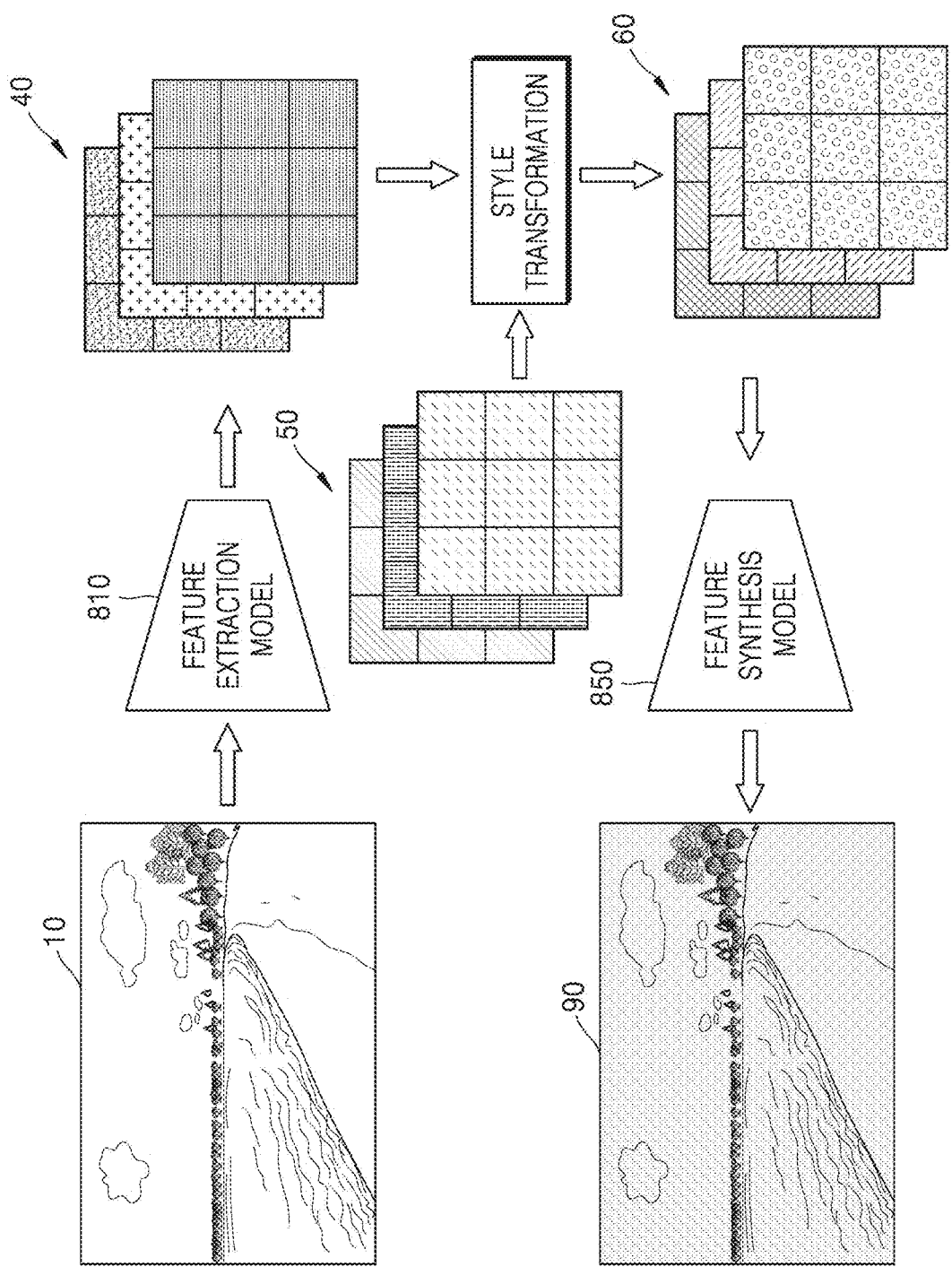
FIG. 8 is a diagram for describing a method of generating a second image based on a first image.

FIG. 8 is a diagram for describing a method of generating a second image 90 based on a first image 10.

Although it has been described above that each of first style data for the first image 10 and reference style data for a target reference image may include at least one of brightness, contrast, viewpoint, tone, white balance, sharpness, histogram, and feature map, FIG. 8 illustrates a case where first style data for the first image 10 and reference style data for a target reference image are respectively feature maps (40 and 50).

The image processing apparatus 100 obtains a first feature map 40 output from a feature extraction model 810 by inputting the first image 10 to the feature extraction model 810. In addition, the image processing apparatus 100 extracts a reference feature map 50 corresponding to a target reference image.

The image processing apparatus 100 may generate a second feature map 60 based on the first feature map 40 and the reference feature map 50, and input the generated second feature map 60 to a feature synthesis model 850. The image processing apparatus 100 may obtain the second image 90 output from the feature synthesis model 850.

In an embodiment, the image processing apparatus 100 may perform a whitening transform on the first feature map 40 and perform a coloring transform on a matrix related to the reference feature map 50 and the first feature map that has undergone the whitening transform to thereby generate the second feature map 60. For example, the image processing apparatus 100 performs a whitening transform by taking a covariance matrix of the first feature map 40 and the first feature map 40 as an input. Style information of the first image 10 is removed from the first feature map that has undergone the whitening transform, and only information about an object in the first image 10 is included in the first feature map that has undergone the whitening transform. Furthermore, the image processing apparatus 100 may perform a coloring transform by taking, as an input, an inverse covariance matrix of the reference feature map 50 and the first feature map that has undergone the whitening transform. The second feature map 60 generated as a result of the coloring transform includes object information of the first image 10 and style information of the target reference image.

Figure 9:
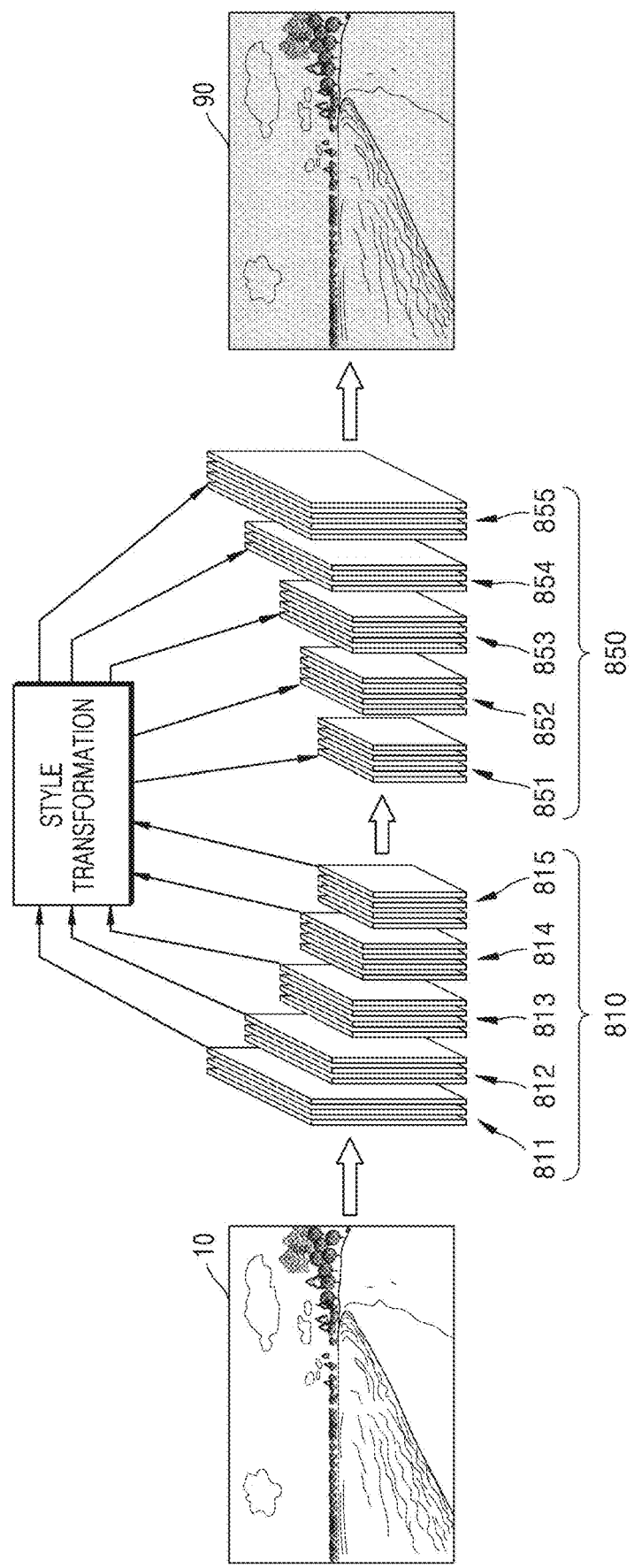
FIG. 9 is a diagram illustrating in detail a feature extraction model and a feature synthesis model shown in FIG. 8.

FIG. 9 is a diagram illustrating in detail the feature extraction model 810 and the feature synthesis model 850 shown in FIG. 8.

As illustrated in FIG. 9, the feature extraction model 810 may include a plurality of convolution layers 811, 812, 813, 814, and 815 for extracting a feature map of the first image 10. In an embodiment, each of the plurality of convolution layers 811, 812, 813, 814, and 815 performs a convolution process on input data by using a predetermined number of filter kernels of a predetermined size.

In an embodiment, at least some of the plurality of convolution layers 811, 812, 813, 814, and 815 may include an activation layer and/or a pooling layer. An activation layer may assign non-linear features to a result output from a previous layer. The activation layer may use an activation function. The activation function may include a sigmoid function, a Tanh function, a rectified linear unit (ReLU) function, or the like, but is not limited thereto.

The feature synthesis model 850 may include a plurality of deconvolution layers 851, 852, 853, 854, and 855 which each take, as an input, feature maps that have undergone style transformation and data output from a previous layer, and then perform a convolution process.

In an embodiment, each of the plurality of deconvolution layers 851, 852, 853, 854, and 855 performs a convolution process on input data by using a predetermined number of filter kernels of a predetermined size. Furthermore, in an embodiment, at least some of the plurality of deconvolution layers 851, 852, 853, 854, and 855 may include an activation layer and/or a pooling layer.

The first deconvolution layer 851 among the plurality of deconvolution layers 851, 852, 853, 854, and 855 takes, as an input, a feature map output from the fifth convolution layer 815 and a feature map that has undergone style transformation after being output from the fifth convolution layer 815, and then performs a convolution process.

The second deconvolution layer 852 takes, as an input, a feature map output from the first deconvolution layer 851 and a feature map that has undergone style transformation after being output from the fourth convolution layer 814, and then performs a convolution process.

The third deconvolution layer 853 takes, as an input, a feature map output from the second deconvolution layer 852 and a feature map that has undergone style transformation after being output from the third convolution layer 813, and then performs a convolution process.

The fourth deconvolution layer 854 takes, as an input, a feature map output from the third deconvolution layer 853 and a feature map that has undergone style transformation after being output from the second convolution layer 812, and then performs a convolution process.

The fifth deconvolution layer 855 takes, as an input, a feature map output from the fourth deconvolution layer 854 and a feature map that has undergone style transformation after being output from the first convolution layer 811, and then performs a convolution process.

Although FIG. 9 shows that the feature extraction model 810 includes the five convolution layers 811, 812, 813, 814, and 815, and the feature synthesis model 850 includes the five deconvolution layers 851, 852, 853, 854 and 855, this is merely an example, and the number of convolution layers that may be included in the feature extraction model 810 and the number of deconvolution layers that may be included in the feature synthesis model 850 may be changed variously. In addition, in an embodiment, the feature extraction model 810 and/or the feature synthesis model 850 may further include a fully connected layer (FCL).

Moreover, in an embodiment, the image processing apparatus 100 may select a target reference image having a high relevance to the first image 10 from among reference images included in any one of a plurality of reference image groups.

The reference image groups may be classified according to a creator of each reference image. For example, the plurality of reference image groups may include a reference image group including reference images generated by creator A, a reference image group including reference images generated by creator B, etc.

The image processing apparatus 100 may display information of each reference image group on the display, and select a target reference image having a high relevance to the first image 10 from among reference images included in a reference image group selected by the user.

Figure 10:
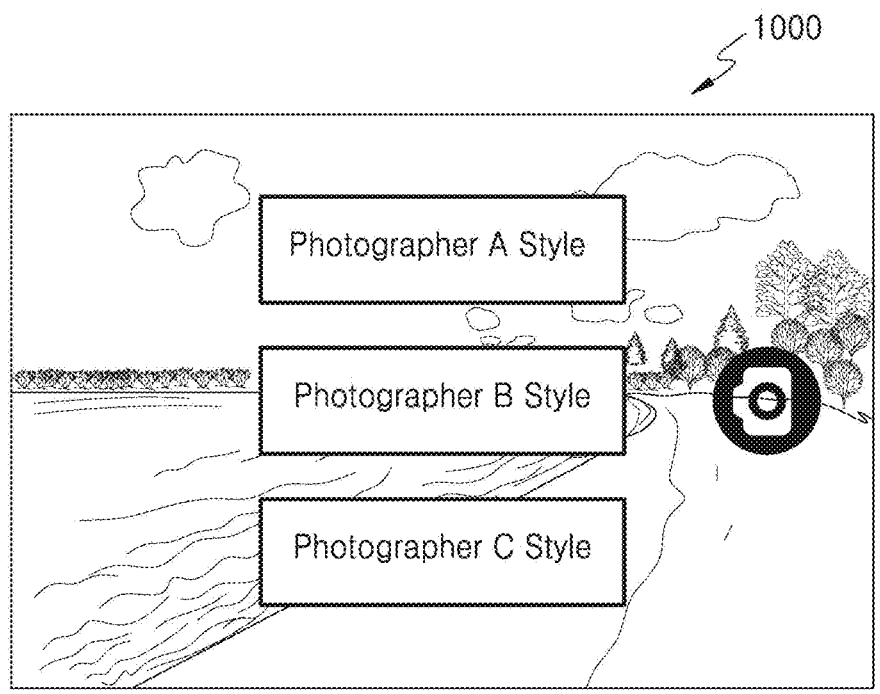
FIG. 10 is an exemplary diagram illustrating information about a reference image group displayed on a display.

For this purpose, as shown in FIG. 10, information representing each reference image group (e.g., creator's identification information, etc.) may be displayed on a display 1000, and the user may select information representing one reference image group.

Because each image creator has his or her own style, the user may capture images according to a preferred creator's style.

As an example, when the image processing apparatus 100 is implemented as a user device, the image processing apparatus 100 may display the information of each reference image group on its own display. In addition, as an example, when the image processing apparatus 100 is implemented as a server, the server may transmit the information of each reference image group to the user device so that the user device may display the information on its display.

Moreover, in an embodiment, when the image processing apparatus 100 is implemented as a user device, assignment of visual sentiment labels to reference images, training of the recognition model 300, and extraction of reference style data may be performed by a server. In other words, processes requiring reference images themselves, such as assignment of visual sentiment labels to reference images, training of the recognition model 300, and extraction of reference style data, may be performed by the server instead of the user device. Visual sentiment labels assigned to reference images, reference style data for the reference images, and data related to the recognition model may be transmitted from the server to the user device. The user device may input the first image 10 to the recognition model 300, obtain reference style data for a target reference image according to a result of comparing labels of the first image 10 with visual sentiment labels of reference images, and generate the second image 90 according to second style data generated based on first style data and reference style data.

In addition, as described above, when reference images are classified into reference image groups, the user device may further store internal parameter information of the recognition model 300, which corresponds to each reference image group. The server may individually train the recognition model 300 for each reference image group and transmit, to the user device, internal parameter information of the recognition model 300, which corresponds to each reference image group. For example, the recognition model 300 may be trained based on reference images included in reference image group A to have internal parameters optimized for the reference image group A, or may be trained based on reference images included in reference image group B to have internal parameters optimized for the reference image group B. The user device may control the recognition model 300 to operate according to internal parameters corresponding to a reference image group selected by the user. For example, the image processing apparatus 100 may change internal parameters of the recognition model 300 to internal parameters corresponding to a reference image group selected by the user and control labels of the first image 10 to be extracted from the recognition model 300 that has the changed internal parameters.

Figure 11:
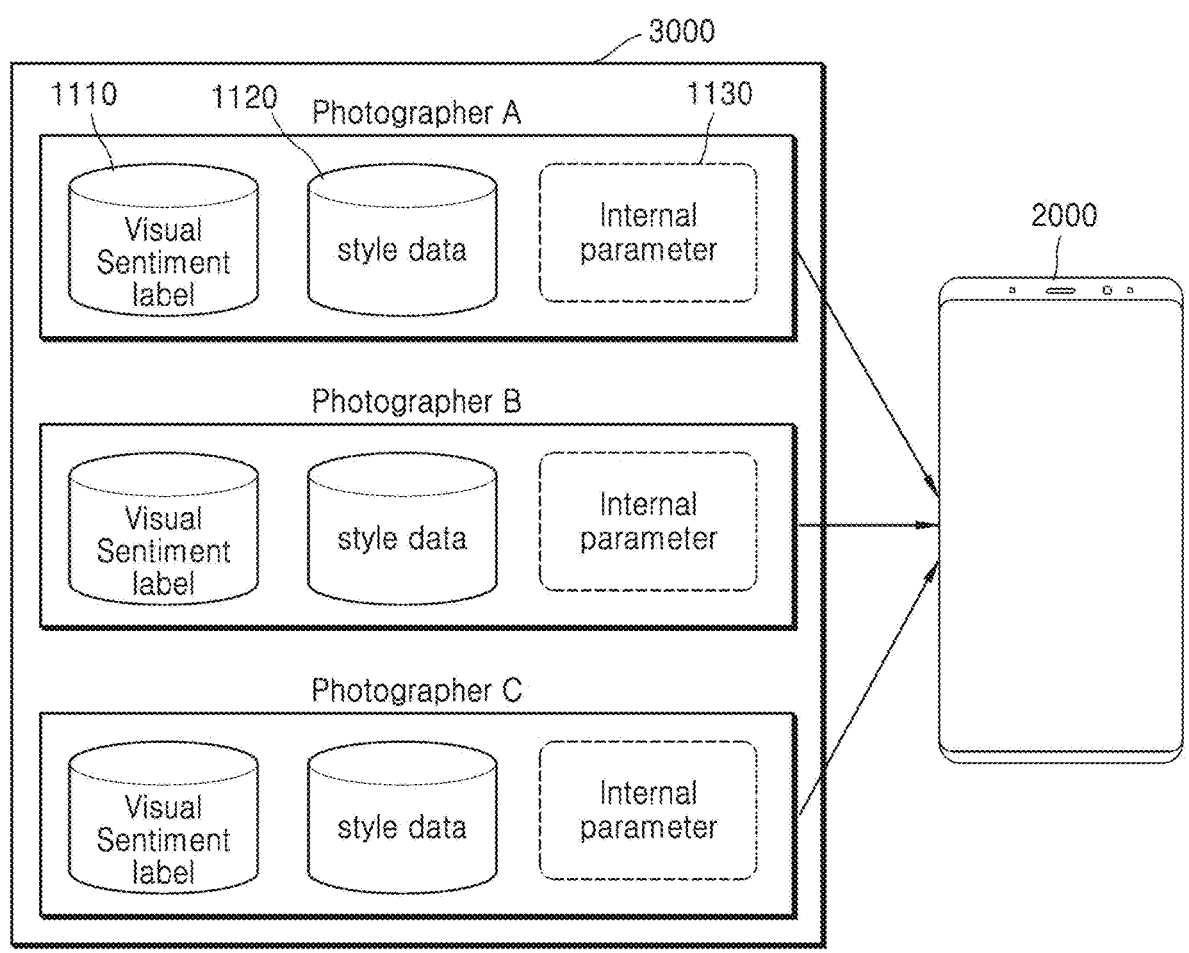
FIG. 11 is a diagram for describing a method of receiving, by an image processing apparatus, data for style transformation from a server.

Referring to FIG. 11, as a user device 2000 is connected to a server 3000, the server 3000 transmits a reference image group list to the user device 2000, and the user device 2000 requests the server 3000 for data related to a reference image group selected by the user from the reference image group list. The server 3000 may transmit, to the user device 2000, visual sentiment labels 1110 of reference images included in the reference image group selected by the user, reference style data 1120 for the reference images, and internal parameters 1130 of the recognition model 300. In other words, as shown in FIG. 11, because instead of the reference images themselves, the server 3000 transmits, to the user device 2000, only the visual sentiment labels 1110 of the reference images, the reference style data 1120 therefor, and the internal parameters 1130 corresponding to each reference image group, the amount of data stored in the user device 2000 may be reduced.

Furthermore, in an embodiment, when the image processing apparatus 100 is implemented as a server, assignment of visual sentiment labels to reference images, training of the recognition model 300, and extraction of reference style data for the reference images may be performed by the server. The server may generate the second image 90 by performing style transformation on the first image 10 received from a user device, and transmit the second image 90 to the user device.

In addition, in an embodiment, even when the image processing apparatus 100 is implemented as a user device, assignment of visual sentiment labels to reference images, training of the recognition model 300, extraction of reference style data for the reference images, etc. may be performed by the user device. The user device may generate the second image 90 by performing style transformation on the first image 10.

Figure 12:
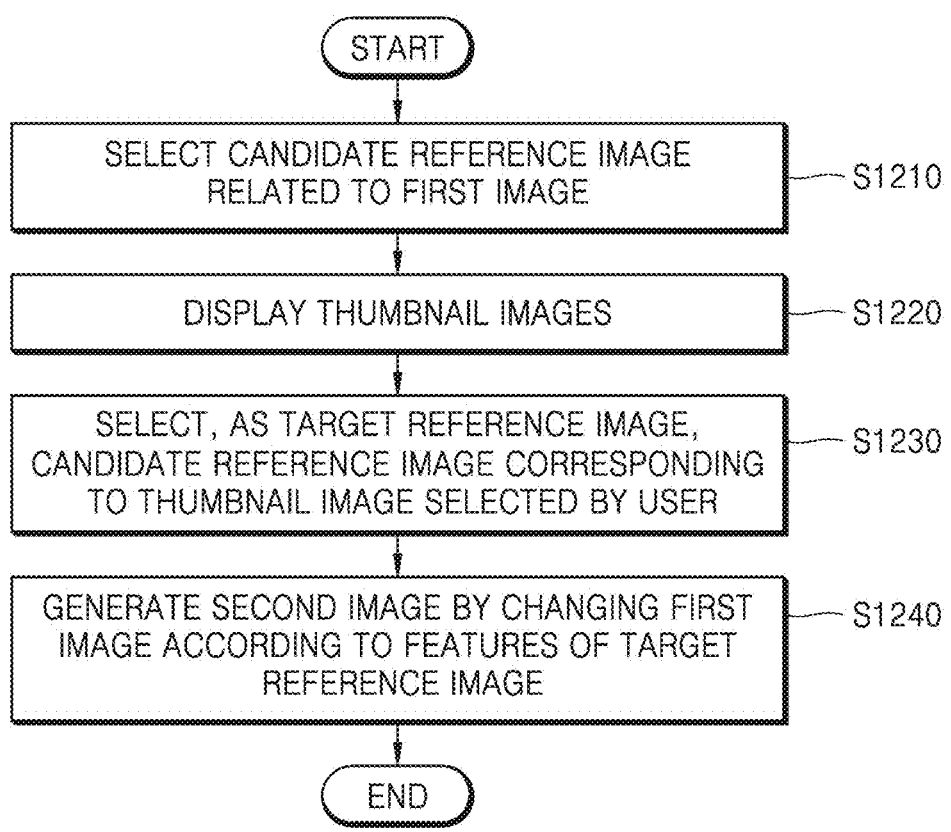
FIG. 12 is a flowchart of an image processing method according to another embodiment.

FIG. 12 is a flowchart of an image processing method according to another embodiment.

In operation S1210, the image processing apparatus 100 selects at least one reference image related to the first image 10 from among a plurality of reference images as at least one candidate reference image. Here, the image processing apparatus 100 may select at least one candidate reference image having a high relevance to the first image 10 by comparing features of the plurality of reference images (at least one of brightness, contrast, viewpoint, tone, white balance, sharpness, histogram, and feature map) with features of the first image 10.

In operation S1220, the image processing apparatus 100 displays at least one thumbnail image corresponding to the at least one candidate reference image on the display. The image processing apparatus 100 may display a thumbnail image obtained by reducing a size of each candidate reference image on the display, or display a thumbnail image obtained when a style of the first image 10 is changed according to each candidate reference image.

As an example, when the image processing apparatus 100 is implemented as a user device, the image processing apparatus 100 may display a thumbnail image on its own display. In addition, as an example, when the image processing apparatus 100 is implemented as a server, the server may transmit a thumbnail image to the user device so that the user device displays the thumbnail image on its display.

In operation S1230, the image processing apparatus 100 selects, as a target reference image, a candidate reference image corresponding to a thumbnail image selected by the user from among at least one thumbnail image displayed on the display. The user may select one of the thumbnail images displayed on the display by using a method such as touching, etc.

In operation S1240, the image processing apparatus 100 may generate the second image 90 by changing the first image 10 according to features of the target reference image. For example, the image processing apparatus 100 may generate the second image 90 by changing the first image 10 so that features of the first image 10 are the same as/similar to features of the target reference image.

Figure 13:
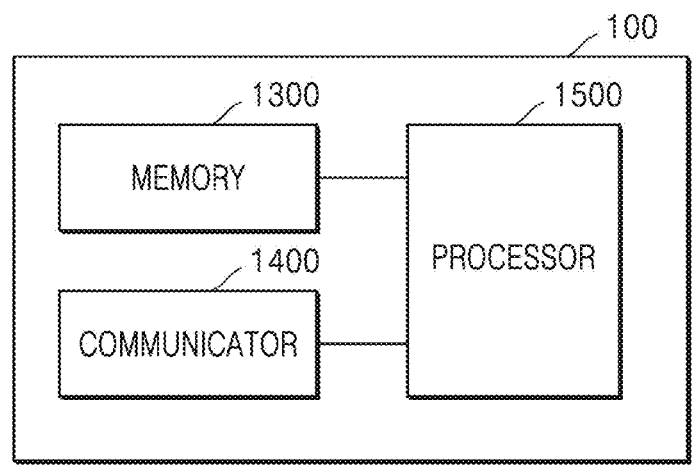
FIG. 13 is a block diagram of a configuration of an image processing apparatus according to an embodiment.

FIG. 13 is a block diagram of a configuration of an image processing apparatus 100 according to an embodiment.

Referring to FIG. 13, the image processing apparatus 100 may include a memory 1300, a communicator 1400, and a processor 1500. The memory 1300, the communicator 1400, and the processor 1500 may operate according to programs stored in the memory 1300.

The memory 1300 may store the recognition model 300. Also, the memory 1300 may further store the feature extraction model 810 and the feature synthesis model 850. In addition, the memory 1300 may store data related to reference images, such as visual sentiment labels assigned to the reference images, reference style data for the reference images, and internal parameters for each reference image group.

The communicator 1400 transmits and receives data to and from an external device over a network.

The processor 1500 inputs the first image 10 to the recognition model 300 to obtain labels and/or probability values of the labels output from the recognition model 300. The processor 1500 obtains reference style data for a target reference image having a high degree of relevance to the first image 10 from among reference images, and generate second style data based on first style data for the first image 10 and the reference style data. In addition, the processor 1500 generates the second image 90 based on the second style data.

In an embodiment, the processor 1500 may train the recognition model 300 based on reference images. The processor 1500 may input reference images and visual sentiment labels assigned to the reference images to the recognition model 300 so that internal parameters of the recognition model 300 are updated.

Hereinafter, a detailed configuration of the processor 1500 when the processor 1500 trains the recognition model 300 will be described with reference to FIGS. 14 through 16.

Figure 14:
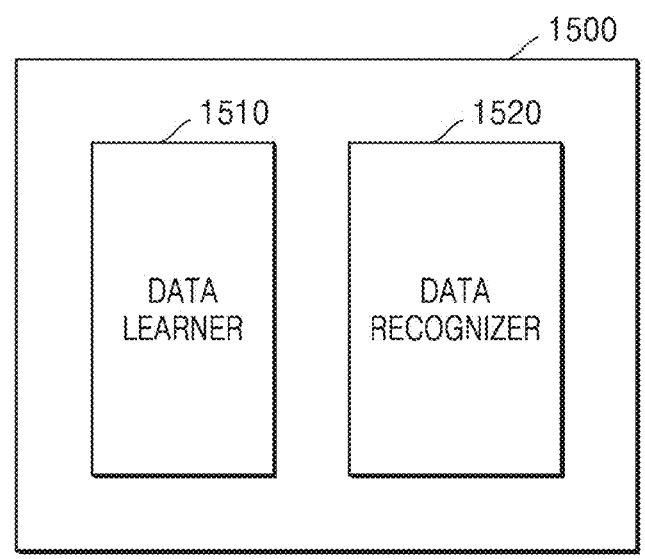
FIG. 14 is a block diagram of a processor shown in FIG. 13.

FIG. 14 is a block diagram of the processor 1500 according to some embodiments.

Referring to FIG. 14, the processor 1500 according to some embodiments may include a data learner 1510 and a data recognizer 1520.

The data learner 1510 may learn a criterion for determining a situation (e.g., determining a label corresponding to an image). The data learner may learn criteria with respect to what data will be used to determine a certain situation and how to determine the situation by using data. The data learner 1510 may obtain data to be used for training and learn a criterion for determining a situation by applying the obtained data to the recognition model 300.

The data recognizer 1520 may recognize a situation based on data. The data recognizer 1520 may recognize a situation from data by using the trained recognition model 300. The data recognizer 1520 may obtain data according to learned preset criteria and determine a certain situation based on data by using the recognition model 300 that takes the obtained data as an input value. Furthermore, a resulting value output by the recognition model 300 that takes the obtained data as an input value may be used to update the recognition model 300.

At least one of the data learner 1510 and the data recognizer 1520 may be fabricated in the form of at least one hardware chip and be mounted in an electronic device. For example, at least one of the data learner 1510 and the data recognizer 1520 may be manufactured in the form of a dedicated hardware chip for AI or as part of an existing general-purpose processor (e.g., a central processing unit (CPU) or application processor (AP)) or dedicated graphics processor (e.g., a graphics processing unit (GPU)) and may be mounted in various electronic devices as described above.

In this case, the data learner 1510 and the data recognizer 1520 may be mounted in one electronic device, or be respectively mounted in different electronic devices. For example, one of the data learner 1510 and the data recognizer 1520 may be included in the user device 2000 while the other may be included in the server 3000. Furthermore, the data learner 1510 and the data recognizer 1520 may communicate with each other via a wire or wirelessly such that information about a model built by the data learner 1510 may be provided to the data recognizer 1520 and data input to the data recognizer 1520 may be provided to the data learner 1510 as additional training data.

Moreover, at least one of the data learner 1510 and the data recognizer 1520 may be implemented as a software module. When the at least one of the data learner 1510 and the data recognizer 1520 is implemented as a software module (or a program module including instructions), the software module may be stored in non-transitory computer readable recording media. Furthermore, in this case, the at least one software module may be provided by an operating system (OS) or application. Alternatively, some of the at least one software module may be provided by the OS while the rest thereof may be provided by the application.

Figure 15:
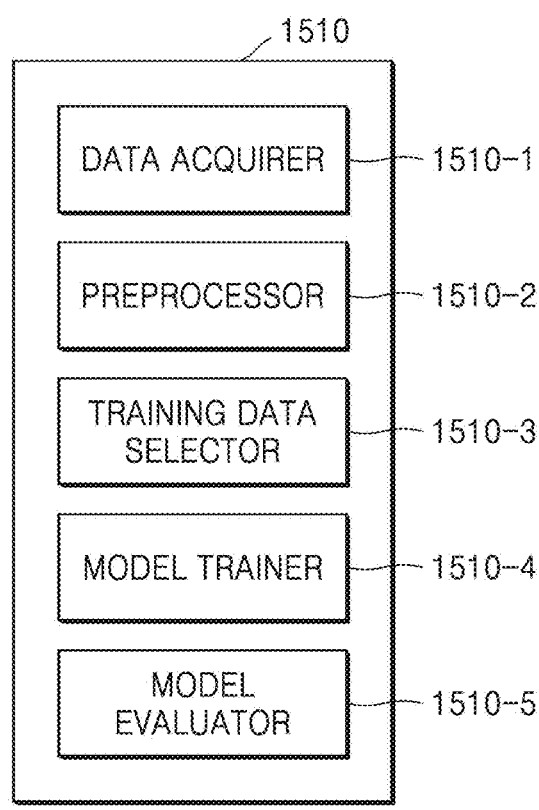
FIG. 15 is a block diagram of a data learner shown in FIG. 14.

FIG. 15 is a block diagram of the data learner 1510 according to some embodiments.

Referring to FIG. 15, according to some embodiments, the data learner 1510 may include a data acquirer 1510-1, a preprocessor 1510-2, a training data selector 1510-3, a model trainer 1510-4, and a model evaluator 1510-5.

The data acquirer 1510-1 may obtain data necessary for determining a situation. The data acquirer 1510-1 may obtain data necessary to perform training for determining a situation.

The data acquirer 1510-1 may obtain image data captured by a camera or received from an external device via a network. Alternatively, the data acquirer 1510-1 may obtain preview image data recognized by a camera.

The preprocessor 1510-2 may preprocess the obtained data such that the obtained data may be used in training for determining a situation. The preprocessor 1510-2 may process the obtained data into a preset format so that the model trainer 1510-4 to be described later may use the obtained data in training for determining a situation.

The training data selector 1510-3 may select data necessary for training from among the preprocessed data. The selected data may be provided to the model trainer 1510-4. The training data selector 1510-3 may select data necessary for training from among the preprocessed data according to preset criteria for determining a situation. Furthermore, the training data selector 1510-3 may select data according to preset criteria learned by the model trainer 1510-4 to be described later.

The model trainer 1510-4 may learn a criterion with respect how to determine a situation based on training data. Furthermore, the model trainer 1510-4 may learn a criterion with respect to what training data needs to be used for determining a situation.

Furthermore, the model trainer 1510-4 may train the recognition model 300 used to determine a situation by using training data. In this case, the recognition model 300 may be a pre-built model. For example, the recognition model 300 may be a model pre-built by taking basic training data (e.g., sample images, etc.) as an input.

The recognition model 300 may be built by taking into account an application field of the recognition model 300, an objective of learning, or a computer performance of a device. For example, the recognition model 300 may be a model based on a neural network. Models such as a DNN, a recurrent neural network (RNN), and a bidirectional recurrent DNN (BRDNN) may be used as the recognition model 300, but embodiments are limited thereto.

According to various embodiments, when there are a plurality of pre-built recognition models 300, the model trainer 1510-4 may determine the recognition model 300 having a high correlation between input training data and basic training data as the recognition model 300 to be trained. In this case, the basic training data may be pre-classified according to a type of data, and the recognition model 300 may be pre-built for each data type. For example, the basic training data may be pre-classified based on various criteria such as an area where the training data is generated, a time at which the training data is generated, a size of the training data, a genre of the training data, a creator of the training data, a type of an object in the training data, etc.

Furthermore, the model trainer 1510-4 may train the recognition model 300 by using, for example, a learning algorithm including error back-propagation or gradient descent.

Furthermore, the model trainer 1510-4 may train the recognition model 300, for example, through supervised learning using training data as an input value. Furthermore, the model trainer 1510-4 may train the recognition model 300, for example, via unsupervised learning that allows the recognition model 300 to discover a criterion for determining a situation by self-learning types of data necessary for determining the situation without any special guidance. Furthermore, the model trainer 1510-4 may train the recognition model 300 by using, for example, reinforcement learning exploiting feedback regarding whether a result of determining a situation via training is correct.

In addition, when the recognition model 300 is trained, the model trainer 1510-4 may store the trained recognition model 300. In this case, the model trainer 1510-4 may store the trained recognition model 300 in a memory of an electronic device including the data recognizer 1520. Alternatively, the model trainer 1510-4 may store the trained recognition model 300 in a memory of an electronic device including the data recognizer 1520 to be described later. Alternatively, the model trainer 1510-4 may store the trained recognition model 300 in a memory of the server 3000 connected via a wire or wirelessly to an electronic device.

In this case, the memory in which the trained recognition model 300 is stored may also store commands or data related to at least one other component of the electronic device. Furthermore, the memory may also store software and/or programs. For example, the programs may include kernel, middleware, application programing interface (API) and/or application program (or "application").

The model evaluator 1510-5 may input evaluation data to the recognition model 300 and cause the model trainer 1510-4 to train again the recognition model 300 when a recognition result obtained from the evaluation data does not satisfy a preset criterion. In this case, the evaluation data may be preset data for evaluating the recognition model 300.

For example, when the number or ratio of pieces of evaluation data with respect to which recognition results are not accurate from among recognition results output from the trained recognition model 300 with respect to evaluation data exceeds a preset threshold, the model evaluator 1510-5 may evaluate that the preset criterion is not satisfied. For example, when the preset criterion is defined as a ratio of 2%, and when the trained recognition model 300 outputs wrong recognition results with respect to more than 20 pieces of evaluation data among a total of 1000 pieces of evaluation data, the model evaluator 1510-5 may evaluate the trained recognition model 300 as not being suitable.

Moreover, when a plurality of trained recognition models 300 exist, the model evaluator 1510-5 may evaluate whether each of the trained recognition models 300 satisfies a preset criterion, and determine a model that has satisfied the preset criterion as the final recognition model 300. In this case, when there are a plurality of models that has satisfied the preset criterion, the model evaluator 1510-5 may determine, as the final recognition model 300, one model or a certain number of models preset in order from highest to lowest evaluation scores.

Moreover, at least one of the data acquirer 1510-1, the preprocessor 1510-2, the training data selector 1510-3, the model trainer 1510-4, and the model evaluator 1510-5 in the data learner 1510 may be fabricated in the form of at least one hardware chip and be mounted in an electronic device. For example, at least one of the data acquirer 1510-1, the preprocessor 1510-2, the training data selector 1510-3, the model trainer 1510-4, and the model evaluator 1510-5 may be manufactured in the form of a dedicated hardware chip for AI or as part of an existing general-purpose processor (e.g., a CPU or AP) or dedicated graphics processor (e.g., a GPU) and may be mounted in various electronic devices as described above.

Furthermore, the data acquirer 1510-1, the preprocessor 1510-2, the training data selector 1510-3, the model trainer 1510-4, and the model evaluator 1510-5 may be mounted in one electronic device, or be respectively mounted in different electronic devices. For example, some of the data acquirer 1510-1, the preprocessor 1510-2, the training data selector 1510-3, the model trainer 1510-4, and the model evaluator 1510-5 may be included in the user device 2000 while the rest thereof may be included in the server 3000.

In addition, at least one of the data acquirer 1510-1, the preprocessor 1510-2, the training data selector 1510-3, the model trainer 1510-4, and the model evaluator 1510-5 may be implemented as a software module. When the at least one of the data acquirer 1510-1, the preprocessor 1510-2, the training data selector 1510-3, the model trainer 1510-4, and the model evaluator 1510-5 is implemented as a software module (or a program module including instructions), the software module may be stored in non-transitory computer readable recording media. Furthermore, in this case, the at least one software module may be provided by an OS or application. Alternatively, some of the at least one software module may be provided by the OS while the rest thereof may be provided by the application.

Figure 16:
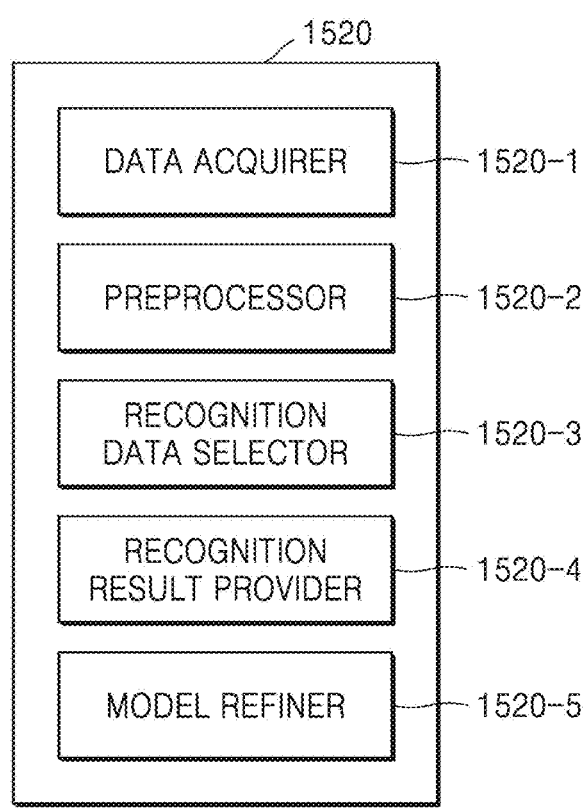
FIG. 16 is a block diagram of a data recognizer shown in FIG. 14.

FIG. 16 is a block diagram of the data recognizer 1520 according to some embodiments.

Referring to FIG. 16, according to some embodiments, the data recognizer 1520 may include a data acquirer 1520-1, a preprocessor 1520-2, a recognition data selector 1520-3, a recognition result provider 1520-4, and a model refiner 1520-5.

The data acquirer 1520-1 may obtain data necessary for determining a situation, and the preprocessor 1520-2 may preprocess the obtained data such that the obtained data may be used for determining a situation. The preprocessor 1520-2 may process the obtained data into a preset format such that the recognition result provider 1520-4 to be described later may use the obtained data for determining a situation.

The recognition data selector 1520-3 may select, from among pieces of preprocessed data, data necessary for determining a situation. The selected data may be provided to the recognition result provider 1520-4. The recognition data selector 1520-3 may select some or all of the pieces of preprocessed data according to preset criteria for determining a situation. The recognition data selector 1520-3 may select data according to preset criteria learned by the model trainer 1510-4.

The recognition result provider 1520-4 may determine a situation by applying the selected data to the recognition model 300. The recognition result provider 1520-4 may provide a recognition result according to a purpose of data recognition. The recognition result provider 1520-4 may apply the data selected by the recognition data selector 1520-3 to the recognition model 300 by using the selected data as an input value. Furthermore, the recognition result may be determined by the recognition model 300. For example, the recognition result provider 1520-4 may apply the first image 10 selected by the recognition data selector 1520-3 to the recognition model 300. Labels corresponding to the first image 10 and probability values of the labels may be determined as the recognition result.

The model refiner 1520-5 may update the recognition model 300 based on evaluation of the recognition result provided by the recognition result provider 1520-4. For example, the model refiner 1520-5 may provide the recognition result from the recognition result provider 1520-4 to the model trainer 1510-4 so that the model trainer 1510-4 may update the recognition model 300.

Moreover, at least one of the data acquirer 1520-1, the preprocessor 1520-2, the recognition data selector 1520-3, the recognition result provider 1520-4, and the model refiner 1520-5 in the data recognizer 1520 may be fabricated in the form of at least one hardware chip and be mounted in an electronic device. For example, at least one of the data acquirer 1520-1, the preprocessor 1520-2, the recognition data selector 1520-3, the recognition result provider 1520-4, and the model refiner 1520-5 may be manufactured in the form of a dedicated hardware chip for AI or as part of an existing general-purpose processor (e.g., a CPU or AP) or dedicated graphics processor (e.g., a GPU) and may be mounted in various electronic devices as described above.

Furthermore, the data acquirer 1520-1, the preprocessor 1520-2, the recognition data selector 1520-3, the recognition result provider 1520-4, and the model refiner 1520-5 may be mounted in one electronic device, or be respectively mounted in different electronic devices. For example, some of the data acquirer 1520-1, the preprocessor 1520-2, the recognition data selector 1520-3, the recognition result provider 1520-4, and the model refiner 1520-5 may be included in the user device 2000 while the rest thereof may be included in the server 3000.

In addition, at least one of the data acquirer 1520-1, the preprocessor 1520-2, the recognition data selector 1520-3, the recognition result provider 1520-4, and the model refiner 1520-5 may be implemented as a software module. When the at least one of the data acquirer 1520-1, the preprocessor 1520-2, the recognition data selector 1520-3, the recognition result provider 1520-4, and the model refiner 1520-5 is implemented as a software module (or a program module including instructions), the software module may be stored in non-transitory computer readable recording media. Furthermore, in this case, the at least one software module may be provided by an OS or application. Alternatively, some of the at least one software module may be provided by the OS while the rest thereof may be provided by the application.

Figure 17:
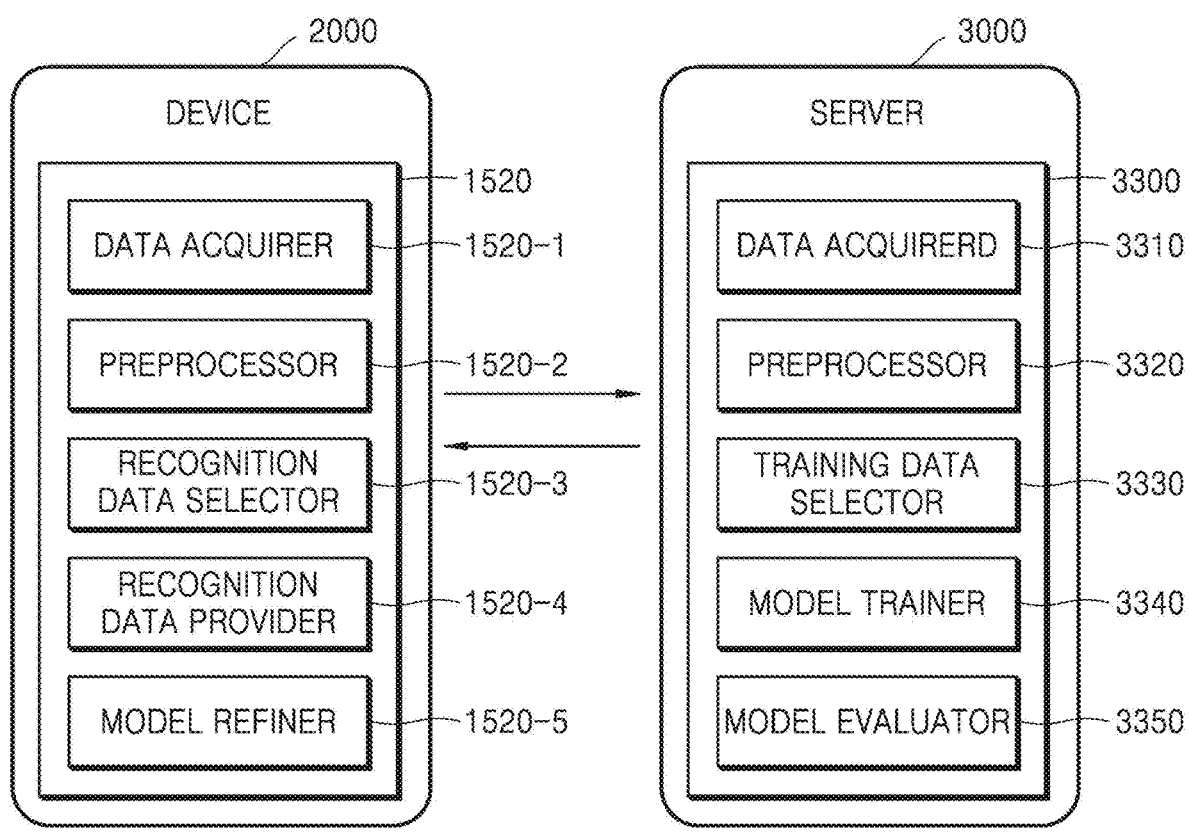
FIG. 17 is a diagram illustrating an example in which a user device and a server interwork with each other to learn and recognize data, according to some embodiments.

FIG. 17 is a diagram illustrating an example in which the user device 2000 and the server 3000 interwork with each other to learn and recognize data, according to some embodiments.

Referring to FIG. 17, the server 3000 may learn criteria for determining a situation (e.g., determining a label corresponding to an image), and the user device 1000 may determine a situation based on a result of the learning by the server 3000.

In this case, a model trainer 3340 of the server 3000 may perform functions of the data learner 1510 shown in FIG. 15. The model trainer 3340 of the server 3000 may learn criteria with respect to what data will be used to determine a certain situation and how to determine the situation by using data. The model trainer 3340 may obtain data to be used for training and learn criteria for determining a situation by applying the obtained data to the recognition model 300.

Furthermore, the recognition result provider 1520-4 of the user device 2000 may determine a situation by applying data selected by the recognition data selector 1520-3 to the recognition model 300 generated by the server 3000. For example, the recognition result provider 1520-4 may transmit data selected by the recognition data selector 1520-3 to the server 3000 and request the server 3000 to determine a situation by applying the data selected by the recognition data selector 1520-3 to the recognition model 300. Furthermore, the recognition result provider 1520-4 may receive, from the server 3000, information about the situation determined by the server 3000.

Alternatively, the recognition result provider 1520-4 of the user device 2000 may receive the recognition model 300 generated by the server 3000 from the server 3000 and determine the situation by using the received recognition model 300. In this case, the recognition result provider 1520-4 of the user device 2000 may determine the situation by applying the data selected by the recognition data selector 1520-3 to the recognition model 300 received from the server 3000.

Moreover, the above-described embodiments of the present disclosure may be written as computer-executable programs, and the written programs may be stored in a medium.

The medium may be a medium for continuously storing the computer-executable programs or temporarily storing the computer-executable programs for execution or downloading. Furthermore, the medium may be any recording medium or storage medium in which a single piece or plurality of pieces of hardware are combined, and the medium is not limited to a medium directly connected to a computer system, but may be distributed on a network. Examples of the medium include magnetic media such as hard disks, floppy disks and magnetic tapes, optical recording media such as CD-ROMs and DVDs, magneto-optical media such as floptical disks, ROM, RAM, flash memory, and the like, and may be configured to store program instructions. Other examples of the medium may include recording media or storage media managed by application stores distributing applications or by websites, servers, etc., supplying or distributing other various types of software.

While preferred embodiments based on a technical idea of the present disclosure have been described in detail, the technical idea of the present disclosure is not limited to the embodiments, and various changes or modifications may be made by those of ordinary skill in the art without departing from the scope of the technical idea of the present disclosure.

The invention claimed is:
1. An image processing method comprising:
   obtaining a plurality of labels of a first image and probability values respectively corresponding to the plurality of labels by inputting the first image to a recognition model;

for each of at least one candidate reference image, to which a same one or more visual sentiment label as one or more of the plurality of labels of the first image are assigned, calculating a degree of relevance to the first image by calculating an average of probability values respectively corresponding to the one or more of the plurality of labels as the degree of relevance;

obtaining, based on the calculated degree of relevance, reference style data for a target reference image among the at least one candidate reference image;

generating second style data based on first style data for the first image and the obtained reference style data; and generating a second image based on the generated second style data.

2. The image processing method of claim 1, wherein the obtaining of the reference style data for the target reference image comprises:

selecting, based on the calculated degree of relevance, the target reference image from among the at least one candidate reference image.

3. The image processing method of claim 1, wherein the obtaining of the reference style data for the target reference image comprises:

displaying, on a display, at least one thumbnail image corresponding to the at least one candidate reference image in an order based on the degree of relevance; and selecting, as the target reference image, a candidate reference image corresponding to a thumbnail image selected by a user from among the at least one thumbnail image.

4. The image processing method of claim 1, wherein the obtaining of the reference style data for the target reference image comprises selecting, based on a frequency of selection by a user, the target reference image from among at least one candidate reference image to which a same visual sentiment label as the label of the first image is assigned.

5. The image processing method of claim 1,
wherein the obtaining of the plurality of labels of the first image comprises obtaining a label of a region of interest in the first image by inputting the region of interest to the recognition model, and wherein the calculating of the degree of relevance to the first image comprises obtaining the reference style data for the target reference image to which a same visual sentiment label as the label of the region of interest is assigned.

6. The image processing method of claim 5, wherein the obtaining of the reference style data for the target reference image comprises:

identifying the at least one candidate reference image to which the same visual sentiment label as the label of the region of interest is assigned;

calculating the degree of relevance to the first image for each of the at least one candidate reference image; and selecting, based on the calculated degree of relevance, the target reference image from among the at least one candidate reference image.

7. The image processing method of claim 6,
wherein the obtaining of the plurality of labels of the first image comprises obtaining a plurality of labels of the first image and probability values respectively corresponding to the plurality of labels, wherein the calculating of the degree of the relevance comprises, for each of at least one candidate reference image to which same one or more visual sentiment labels as one or more of the plurality of labels of the first image are assigned, calculating an average of probability values respectively corresponding to the one or more of the plurality of labels as the degree of relevance, and wherein each of the probability values corresponding to the label of the region of interest is set to a preset value.

8. The image processing method of claim 1, further comprising:

changing internal parameters of the recognition model to internal parameters corresponding to a reference image group selected by a user from among a plurality of reference image groups; and inputting the first image to the recognition model that has the changed internal parameters.

9. The image processing method of claim 8, wherein the plurality of reference image groups are classified according to a creator of reference images.

10. The image processing method of claim 8, further comprising:

connecting to a server and receiving a reference image group list from the server;

receiving a selection, from a user, of at least one reference image group in the reference image group list; and receiving, from the server, internal parameters of the recognition model trained based on reference images included in the selected at least one reference image group, reference style data for the reference images included in the at least one reference image group, and visual sentiment labels assigned to the reference images included in the at least one reference image group.

11. The image processing method of claim 1, further comprising:

obtaining the first style data for the first image by inputting the first image to a feature extraction model; and generating a second image by inputting the generated second style data to a feature synthesis model.

12. A program stored in a non-transitory computer readable medium to perform the image processing method of claim 1.

13. An image processing apparatus comprising:
a processor; and
a memory storing a recognition model and at least one program, wherein the processor is configured to execute the at least one program to:

obtain a plurality of labels of a first image and probability values respectively corresponding to the plurality of labels by inputting the first image to the recognition model, for each of at least one candidate reference image, to which a same one or more visual sentiment label as one or more of the plurality of labels of the first image are assigned, calculate a degree of relevance to the first image by calculating an average of probability values respectively corresponding to the one or more of the plurality of labels as the degree of relevance, obtain, based on the calculated degree of relevance, reference style data for a target reference image among the at least one candidate reference image, generate second style data based on first style data for the first image and the obtained reference style data, and generate a second image based on the generated second style data.

* * * * *